United States Patent [19]

King et al.

[11] Patent Number: 5,133,948
[45] Date of Patent: Jul. 28, 1992

[54] PROCESS FOR THE REMOVAL OF BISMUTH FROM COPPER REFINING ELECTROLYTE BY USING LEAD OXIDE

[75] Inventors: Michael G. King, Salt Lake City; Jonathan S. Jackson, Holladay; Wing H. Heung, Salt Lake City, all of Utah

[73] Assignee: ASARCO Incorporated, New York, N.Y.

[21] Appl. No.: 728,396

[22] Filed: Jul. 11, 1991

[51] Int. Cl.$^5$ ............................................. C01G 29/00
[52] U.S. Cl. ...................................... 423/87; 423/92; 423/34; 75/705
[58] Field of Search ................... 423/87, 92, 617, 618, 423/619, 620, 34, 24; 75/705; 204/DIG. 13; 505/782

[56] References Cited

U.S. PATENT DOCUMENTS

| | | | |
|---|---|---|---|
| 3,966,461 | 6/1976 | Miller et al. | 423/87 |
| 4,039,323 | 8/1977 | DiMartini et al. | 75/70 |
| 4,157,946 | 6/1979 | Hyvärinen | 423/87 |

OTHER PUBLICATIONS

Journal of Applied Electrochemistry 11 (1981) 751-763
Fundamentals of Lead Acid Cells, Hampson et al.

*Primary Examiner*—Theodore Morris
*Assistant Examiner*—Edward Squillante
*Attorney, Agent, or Firm*—John J. Tomaszewski; Kenneth A. Koch

[57] ABSTRACT

Bismuth impurity is removed from copper electrolyte by contacting the electrolyte with an effective amount of finely divided lead oxide.

3 Claims, No Drawings

PROCESS FOR THE REMOVAL OF BISMUTH FROM COPPER REFINING ELECTROLYTE BY USING LEAD OXIDE

BACKGROUND OF THE INVENTION

The present invention relates to the removal of bismuth from copper electrolyte.

Virtually all commercial copper is produced electrolytically during its production from ore or scrap. The two basic procedures are electrorefining from impure copper anodes or electrowinning following solvent extraction of copper from leach solutions.

Electrorefining consists of electrochemically dissolving copper from impure anodes and selectively plating the dissolved copper in pure form onto copper cathodes. The principal impurities in copper anodes are As, Bi, Fe, Ni, Pb, Sb, Se and Te and these separate from the anode during the process and must be removed to minimize contamination of the copper cathode product. In general, the electrolyte contains about 35-50 g/l copper and 150-230 g/l sulfuric acid.

The Se, Te and Pb are not electrochemically dissolved in the electrolyte during the electrorefining process and are removed in the anode residue slimes. The other impurities, however, are less noble than copper and tend to dissolve electrochemically from the anode along with and even preferentially to the copper of the anode. They tend, therefore, to build up in the electrolyte during electrorefining and must be removed from the electrolyte or they will eventually contaminate the cathode copper, mainly by occlusion of impure electrolyte in the growing cathode deposits. Generally, a bleed stream is specially treated in a purification section of the refinery to remove impurities and recycled to the electrolyte stream. Impurity removal from electrolyte is also a problem in electrowinning processes.

The removal of the bismuth impurity is especially important in the commercial production of copper and many methods have been developed to solve this problem.

In U.S. Pat. No. 4,157,946, which patent is hereby incorporated by reference, a method is disclosed for the selective removal of antimony and bismuth from copper refining electrolyte. The method employs adding to the electrolyte solution a salt of barium, strontium or lead to precipitate the
metal of the salt as a poorly soluble sulfate which co-precipitates the bismuth and antimony. $BaCO_3$, $Ba(OH)_2$ and $PbCO_3$ are exemplified in the patent.

In U.S. Pat. No. 4,179,495 the levels of impurity As, Sb and Bi are reduced in sulfuric acid solutions by adding $Sb_2O_3$, $Bi_2O_3$ and mixtures thereof to the solution to precipitate the impurities.

While the prior art has provided methods to remove bismuth from copper electrolyte the need still exists for a more efficient, improved method of removal.

SUMMARY OF THE INVENTION

This invention provides a highly effective and selective method for removing bismuth from copper electrolyte, in particular copper refining and copper electrowinning electrolyte, which method comprises contacting the electrolyte for a sufficient time with an effective amount of the compound lead oxide. It is highly preferred that the lead oxide be of an average particle size less than about 50 microns and is preferably less than about 5 microns, e.g., 1.5 microns. The amount used is about 0.01 to 0.5 or higher, preferably 0.05 to 0.2, most preferably 0.1 to 0.2, grams of lead oxide per mg of Bi contained in the volume of electrolyte being treated.

DETAILED DESCRIPTION OF THE INVENTION

The contacting of the bismuth containing copper electrolyte with the lead oxide may be achieved in any convenient manner such as by mixing the electrolyte and lead oxide together in, for example, a kettle, reactor, etc. The contact time may vary and is generally up to about 4 hours, preferably 0.5 to 3 hours, and most preferably 2 to 3 hours.

With respect to the temperature of the electrolyte during treatment, the temperature may vary widely up to about 75° C. or higher, preferably 45° C. to 75° C. and most preferably 45° C. to 65° C.

In general, a bleed stream of the electrolyte will be treated and recycled to the main electrolyte solution. Treatment includes separation of the solids which includes unreacted lead oxide, lead oxide reaction product and impurities by, for example, filtration, with the filtrate being recycled to the electrorefining or electrowinning operation.

It is an important feature of the invention that the lead oxide be finely divided. For example, the average particle size is less than about 50 microns, preferably about 0.5 to 5 microns and most preferably 1 to 3 microns, e.g., 1.5 microns, since the efficiency of the bismuth separation is significantly enhanced.

While any PbO may be used it is highly preferred that Barton Pot oxide be employed because of its demonstrated effectiveness. Barton Pot oxide contains about 85 to 95% by weight lead, the balance being essentially oxygen and some impurities. About 25 to 30% by weight of the contained lead is present as lead metal with the remaining lead as lead oxide.

The present invention is illustrated by the following examples.

EXAMPLE I

Electrorefining electrolyte containing about 45 g/l copper, 180 g/l sulfuric acid and the indicated amount of bismuth was tested as follows. 100 gallons of the electrolyte were added to a 150 gallon steam jacketed tank equipped with a Lightnin Mixer. Temperature of the electrolyte was maintained at about 60° C. using the steam jacket. The PbO employed was prepared using a Barton Pot and contained about 90% by weight lead, the balance being essentially oxygen, and had an average particle size of about 1.5 microns.

The PbO was added to the electrolyte at the indicated amount and stirred. Samples of the mixture were taken at the specified intervals, filtered and the filtrate analyzed for bismuth content. The bismuth concentration results are as follows:

TABLE 1

| Time (Hours) | PbO Addition (grams PbO/initial mg Bi contained in electrolyte) | | | |
| --- | --- | --- | --- | --- |
| | 0.14 | 0.11 | 0.08 | 0.11* |
| 0 | 312 ppm | 316 ppm | 314 ppm | 304 ppm |
| .25 | NT | 126 ppm | 164 ppm | 212 ppm |
| .5 | 8 ppm | 84 ppm | 132 ppm | 202 ppm |
| 1 | NT | 34 ppm | 106 ppm | 198 ppm |
| 1.5 | 6 ppm | NT | NT | NT |
| 2 | 6 ppm | 8 ppm | 60 ppm | 198 ppm |
| 3 | 6 ppm | 8 ppm | 40 ppm | 194 ppm |

TABLE 1-continued

| Time (Hours) | PbO Addition (grams PbO/initial mg Bi contained in electrolyte) | | | |
|---|---|---|---|---|
| | 0.14 | 0.11 | 0.08 | 0.11* |
| 4 | NT | 6 ppm | NT | NT |

*Air mixing using an air line attached to a hollow stainless steel rod as a sparger and the electrolyte was not heated. The temperature started at 54° C. and finished at 48° C.
NT = not tested As can be seen from the TABLE, increasing the amount of PbO has a significant effect on the rate and degree of bismuth removal. With regard to the run with air mixing, further tests showed that the temperature drop had a minor effect on bismuth removal with the major effect being the lack of agitation produced by the air.

Similar tests showed that the addition of Barton Pot PbO did not have any significant effect on the levels of Sb, As and Cu in the electrolyte.

EXAMPLE 2

Electrolyte in a closed loop commercial system with eleven full size operating electrorefining cells was batch treated with Barton Pot lead oxide over two complete anode cycles of 28 days each. The batch treatment was conducted in a similar agitation tank system as described in Example 1 except there was no heating of the electrolyte. The treated, filtered electrolyte was returned to the operating electrorefining cells. Over the 56 day period, 119 batches of electrolyte were treated at 125 gallons per batch. The average treatment time per batch was 3 hours and the average starting and ending temperatures of the electrolyte batches were 52 and 46° C. respectively. The initial electrolyte in the system contained 300 ppm Bi. At the end of the 56 day period, the Bi level was 116 ppm. An average of 85% of the Bi was removed from each batch of electrolyte treated with an average lead oxide addition of 0.11 grams of lead oxide per initial mg of Bi in the batch of electrolyte being treated. Excellent cathode quality was obtained.

We claim:

1. A method for the removal of bismuth from copper electrolyte comprising contacting the electrolyte for a time up to about 4 hours at a temperature of up to about 75° C. with lead oxide which is added to the electrolyte in an amount of about 0.01 to 0.5 grams per mg. of bismuth contained in the electrolyte being treated.

2. The method of claim 1 wherein the electrolyte is copper refining electrolyte.

3. The method of claim 2 wherein the lead oxide contains about 25% to 30% by weight lead with the remaining lead being lead oxide.

* * * * *